(12) United States Patent
Nishimoto et al.

(10) Patent No.: US 7,972,398 B2
(45) Date of Patent: Jul. 5, 2011

(54) POLISHING COMPOSITION FOR GLASS SUBSTRATE

(75) Inventors: Kazuhiko Nishimoto, Wakayama (JP); Toshiaki Oi, Wakayama (JP)

(73) Assignee: KAO Corporation, Tokyo (JP)

( * ) Notice: Subject to any disclaimer, the term of this patent is extended or adjusted under 35 U.S.C. 154(b) by 911 days.

(21) Appl. No.: 11/808,738

(22) Filed: Jun. 12, 2007

(65) Prior Publication Data
US 2008/0006057 A1 Jan. 10, 2008

(30) Foreign Application Priority Data
Jul. 5, 2006 (JP) ................................ 2006-185907

(51) Int. Cl.
C03C 19/00 (2006.01)
C09G 1/02 (2006.01)

(52) U.S. Cl. ............................. 51/308; 51/307; 451/41
(58) Field of Classification Search ................... 51/308; 451/41
See application file for complete search history.

(56) References Cited

U.S. PATENT DOCUMENTS
6,398,827 B1 6/2002 Ota et al.
2004/0065021 A1* 4/2004 Yoneda et al. ................. 51/298

FOREIGN PATENT DOCUMENTS
GB 2421955 A 7/2006
GB 2433516 A 6/2007
JP 2001-11433 A 1/2001
JP 2001064631 A * 3/2001
JP 3441142 * 6/2003
WO WO-2005/123857 A1 12/2005

OTHER PUBLICATIONS

English language abstract of JP 2002-338232 A (Nov. 27, 2002).
English language abstract of JP 2004-311652 A (Nov. 4, 2004).
Office Action mailed Jan. 31, 2011 issued in corresponding Chinese patent application No. 200710127194.1 (with English translation).

* cited by examiner

*Primary Examiner* — Jerry Lorengo
*Assistant Examiner* — Jared Wood
(74) *Attorney, Agent, or Firm* — Birch, Stewart, Kolasch & Birch, LLP

(57) ABSTRACT

The present invention provides a polishing composition for a glass substrate having a pH of from 1 to 5 and containing silica particles having an average particle size of from 5 to 100 nm, wherein, in a projected image of the silica particles obtainable by an image analysis of electron photomicrographs, an average of an area ratio R of a projected area of the silica particles (A1) to an area of a maximum inscribed circle of the silica particles (A), i.e. (A1/A), is in the range of from 1.2 to 3.0, and the silica particles have an average of 2.0 to 10 projection portions having a curvature radius of from $\frac{1}{5}$ to $\frac{1}{2}$ of a radius of the maximum inscribed circle of the silica particles (r) on the outline of the silica particles in the projected image, and a method for manufacturing a glass substrate, including the step of polishing a substrate to be polished with a polishing load of from 3 to 12 kPa and at a pH of from 1 to 5 while allowing the polishing composition to be present between a polishing pad and the substrate to be polished. The polishing composition for a glass substrate of the present invention can be suitably used, for example, in the manufacture of glass hard disks, aluminosilicate glass for reinforced glass substrates, glass ceramic substrates (crystallized glass substrates), and the like.

7 Claims, 3 Drawing Sheets

(b) Black-and-White Reverse Image (a) TEM Silica Particles Image

Magnification: 100,000 times

Scale: 20 nm

Magnification: 100,000 times

Scale: 20 nm

POLISHING COMPOSITION FOR GLASS SUBSTRATE

FIELD OF THE INVENTION

The present invention relates to a polishing composition for a glass substrate and a method for manufacturing a glass substrate using the polishing composition.

BACKGROUND OF THE INVENTION

Currently, steps of polishing various substrates have been employed in the manufacture of various kinds of substrates. In the field of memory hard disks, there has been employed a step of polishing an aluminum substrate or glass substrate. In the field of display devices such as lenses and liquid crystals, there has been employed a step of polishing glass. In the polishing step for these substrates to be polished, the polishing rate is important in order to increase productivity, and various techniques for increasing polishing efficiency have been proposed. In addition, at the same time, surface roughness is important in order to accelerate the reduction per a recording unit area of a hard disk.

JP2001-11433 A discloses that, when a polishing composition containing a moniliform silica sol of which stable spherical colloidal silica particles dispersed in a fluid medium are strung together only in a single plane is used for precise polishing of an aluminum disk, a glass hard disk, a quarts glass for a photomask, crystal, a substrate having silica such as a $SiO_2$ oxidized film of a semiconductor device on the surface, or a semiconductor wafer, the polishing rate is increased.

JP2002-338232 A discloses that a colloidal silica used as an abrasive of an electronic material such as a silicon wafer, a compound semiconductor wafer, a semiconductor device wafer, a magnetic disk substrate, or a crystal substrate has comparatively a large particle size, and when a colloidal silica is used as silica particles having projections and dents on the surface of the silica particles, it is excellent in polishing efficiency. In addition, JP2004-311652 A also reports that, when a specific amorphous colloidal silica is used in acidity, more excellent polishing properties are expressed than the case where a spherical colloidal silica is used in alkalinity.

SUMMARY OF THE INVENTION

Specifically, the present invention relates to:

[1] a polishing composition for a glass substrate having a pH of from 1 to 5 and containing silica particles having an average particle size of from 5 to 100 nm, wherein, in a projected image of the silica particles obtainable by an image analysis of electron photomicrographs, an average of an area ratio R of a projected area of the silica particles (A1) to an area of a maximum inscribed circle of the silica particles (A), i.e. (A1/A), is in the range of from 1.2 to 3.0, and the silica particles have an average of 2.0 to 10 projection portions having a curvature radius of from ⅕ to ½ of a radius of the maximum inscribed circle of the silica particles (r) on the outline of the silica particles in the projected image; and

[2] a method for manufacturing a glass substrate, including the step of polishing a substrate to be polished with a polishing load of from 3 to 12 kPa and at a pH of from 1 to 5 while allowing the polishing composition containing silica particles having an average particle size of from 5 to 100 nm to be present between a polishing pad and the substrate to be polished, wherein, in a projected image of the silica particles obtainable by an image analysis of electron photomicrographs, an average of an area ratio R of a projected area of the silica particles (A1) to an area of a maximum inscribed circle of the silica particles (A), i.e. (A1/A), is in the range of from 1.2 to 3.0, and the silica particles have an average of 2.0 to 10 projection portions having a curvature radius of from ⅕ to ½ of a radius of the maximum inscribed circle of the silica particles (r) on the outline of the silica particles in the projected image.

DETAILED DESCRIPTION OF THE INVENTION

Figure 1:
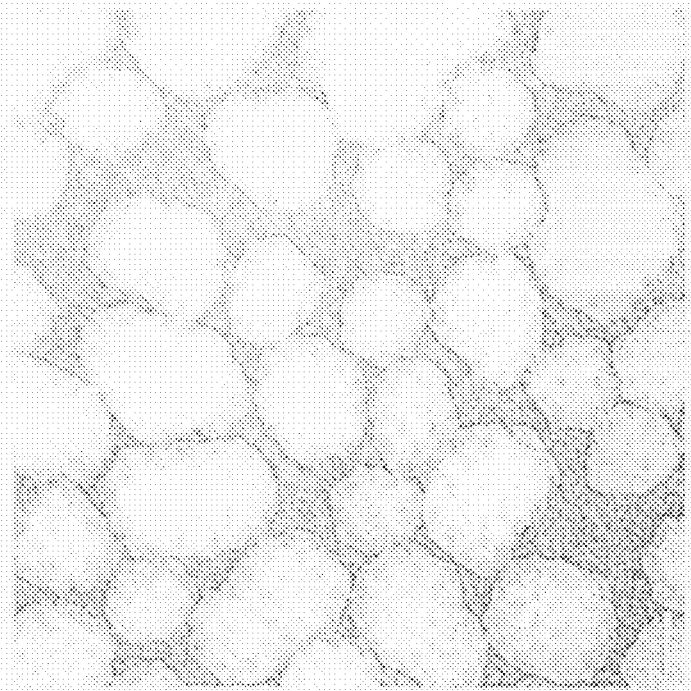
FIG. 1 (a) is a TEM silica particles image obtained by a transmission electron microscope (TEM), and FIG. 1 (b) is a black-and-white reverse image of the silica particles image obtained by TEM.
Figure 1:
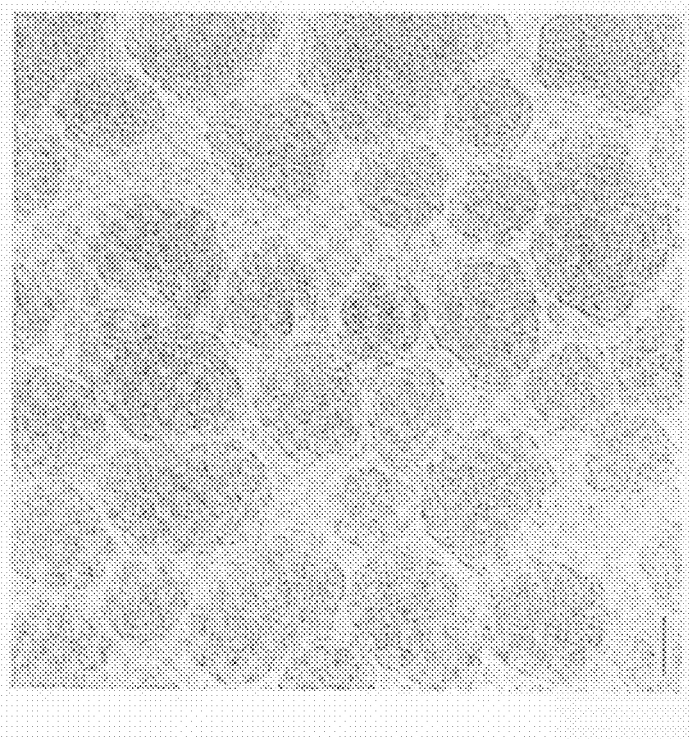

A conventional polishing composition does not meet a satisfactory level for both smoothness of surface roughness and a high polishing rate. Therefore, it is highly significant to provide a means that is capable of manufacturing a substance of excellent quality having low surface roughness at a high polishing rate; in other words, a means that can meet a satisfactory level from both an economic advantage and surface smoothness. Accordingly, the present invention relates to a polishing composition for a glass substrate which is capable of manufacturing a substrate of excellent quality having low surface roughness at a high polishing rate, and a method for manufacturing a glass substrate.

According to the present invention, a polishing composition for a glass substrate that is capable of manufacturing a substrate of excellent quality having low surface roughness at a high polishing rate which has not been able to be conventionally accomplished, in other words, a polishing composition for a glass substrate that can meet a satisfactory level from both an economic advantage and surface smoothness, and a method for manufacturing a glass substrate can be provided.

These and other advantages of the present invention will be apparent from the following description.

The polishing composition for a glass substrate of the present invention is a polishing composition containing silica particles. An average particle size of the silica particles is calculated as a diameter (circular diameter), assuming the silica particles are true spherical silica particles, based on a specific surface area S obtained according to a nitrogen absorption method (BET method). The calculation is performed according to the following procedures. When a diameter of the silica particles is defined as D (cm), a density of the silica particles is defined as $\rho$ (g/cm³), and the number of the total particles is defined as n (number), surface area of the total particles is $n\pi D^2$, and a mass of the total particles is $\rho n\pi D^3/6$. Accordingly, a specific surface area S of BET method which means a surface area per a unit mass can be represented by the following formula (1);

$$S\ (m^2/g) = \{n\pi D^2\}/\{\rho n\pi D^3/6\} = 6 \times 10^{-4}/\{\rho \times D\} \quad (1)$$

According to the formula (1), a diameter of the particles D is represented by;

$$D\ (cm) = 6 \times 10^{-4}/\{\rho \times S\} \quad (2)$$

Moreover, when a density of colloidal silica particles ρ is defined as 2.2 (g/cm³), a diameter of the colloidal silica particles D can be obtained according to the following formula (3);

$$D\ (nm) = 6 \times 10^{3}/\{2.2 \times S\} = 2727/S \quad (3)$$

The silica particles of the present invention have an average particle size of from 5 to 100 nm, preferably from 7 to 80 nm, more preferably from 10 to 60 nm, and even more preferably from 10 to 50 nm, from the viewpoint of increase in the polishing rate and smoothness of surface roughness.

The silica particles used in the present invention are amorphous variant silica particles which are different from true spherical monodisperse particles, or clumpy aggregated particles, the particles strung together like string/beads, and the like, and are defined as follows in the present invention. Specifically, the silica particles of the present invention are, in a projected image of the silica particles obtainable by an image analysis of electron photomicrographs, the silica particles of which an average of an area ratio R of a projected area of the silica particles (A1) to an area of a maximum inscribed circle of the silica particles (A), i.e. (A1/A), is in the range of from 1.2 to 3.0. An electron microscope in the present invention uses a transmission electron microscope (TEM). Although not wanting to be limited by theory, it is presumed that these amorphous variant silica particles have a large friction between the particles or the particles and the polishing pad resulting from a variant state of the silica particles, whereby a transfer of the particles is less and a relative rate to a substrate to be polished can be maintained, so that the silica particles effectively function as abrasive particles.

A projected area of the silica particles (A1) and an area of a maximum inscribed circle of the silica particles (A) of the present invention are determined as follows. An image obtained by a transmission electron microscope (TEM) (JEM-2000FX, commercially available from JEOL LTD.) at an acceleration voltage of 80 kV and a magnification of 50,000 to 100,000 times is analyzed using an image analysis software (WinROOF, commercially available from MITANI CORPORATION). It is preferable that an image resolution during analysis is 0.5 nm/pixel or less. In the present invention, in the case of an image observed at a magnification of 100,000 times, an image has been analyzed in the resolution of 0.22 nm/pixel; and in the case of an image observed at a magnification of 50,000 times, an image has been analyzed in the resolution of 0.44 nm/pixel. The procedures for analysis are that, first, a TEM image for any independent 20 particles is subjected to a hue adjustment/a black-and-white reverse, and thereafter, the particles images are truly reproduced according to binarization, and manual operation as occasion demands, and a projected area (A1) for each of the particles is then obtained according to an automatic calculation. Next, a maximum inscribed circle for each of the particles is manually drawn to obtain an area of a maximum inscribed circle (A), and an area ratio R is calculated from the projected area (A1) and the area of the maximum inscribed circle (A) corresponding to each of the particles, to obtain an average of the area ratio R.

An average of the area ratio R in the present invention is from 1.2 to 3.0, preferably from 1.2 to 2.6, more preferably from 1.2 to 2.2, and even more preferably from 1.2 to 2.0, from the viewpoint of increase in the polishing rate and smoothness of surface roughness.

In addition, the silica particles used in the present invention have an average of 2.0 or more and 10 or less projection portions having a curvature radius of from ⅕ to ½ of a radius of the maximum inscribed circle of the silica particles (r) on the outline of the silica particles in the projected image of the silica particles obtainable by an image analysis of the electron photomicrographs.

Projection portions of the silica particles in the present invention refer to projection portions having a certain extent of size existing on the surface of the particles, in other words, projection portions having a curvature radius of from ⅕ to ½ of a radius of the maximum inscribed circle of the silica particles (r). The silica particles usable in the present invention have an average of 2.0 or more, preferably an average of 3.0 or more, and more preferably an average of 4.0 or more projection portions on the outline of the silica particles in the projected image of the silica particles obtainable by an image analysis of the electron photomicrographs. An upper limit of the number of the projection portions is an average of 10 or less, preferably an average of 8 or less, and more preferably an average of 6 or less. Although not wanting to be limited by theory, it is presumed that the silica particles in this form have a large friction between the particles or the particles and the polishing pad, whereby a transfer of the particles is less and a relative rate to a substrate to be polished can be maintained, so that the silica particles effectively function as abrasive particles, and the projection portions work as points of the polishing action, thereby satisfying both an increase in the polishing rate and smoothness of surface roughness.

A method for counting projection portions of the present invention is as follows. An image obtained by a transmission electron microscope (TEM) (JEM-2000FX, commercially available from JEOL LTD.) at an acceleration voltage of 80 kV and a magnification of 50,000 to 100,000 times are carefully observed the outlines of 20 silica particles in which the above-mentioned area ratio R has been obtained, using an image analysis software (WinROOF, commercially available from MITANI CORPORATION), and the number of the projection portions having a curvature radius of from ⅕ to ½ of a radius of the maximum inscribed circle of each of the particles (r) are counted to provide an average number of the projection portions. It is preferable that an image resolution during analysis is 0.5 nm/pixel or less. In the present invention, in the case of an image observed at a magnification of 100,000 times, an image has been analyzed in the resolution of 0.22 nm/pixel; and in the case of an image observed at a magnification of 50,000 times, an image has been analyzed in the resolution of 0.44 nm/pixel.

The silica particles usable in the present invention include colloidal silica particles, fumed silica particles, surface-modified silica particles, and the like. The colloidal silica particles are preferable from the viewpoint of smoothness of surface roughness. It is preferable that the silica particles are used in a slurry state.

The silica particles usable in the present invention can be obtained by subjecting the conventionally known silica monodisperse particles or sol to a hydrothermal treatment in high concentration, or adding a binder component to the above monodisperse particles dispersion or sol and subjecting the mixture to a heat treatment, to agglutinate the monodisperse particles. These variant silica particles are separated and classified the resulting variant particles dispersion to eliminate the monodisperse particles as occasion demands, or added monodisperse particles in some cases, and whereby the variant silica particles can be used by adjusting the size of the variant particles, and a ratio of the variant particles in a polishing composition to a desired extent.

The silica particles are contained in an amount of preferably from 1 to 40% by weight, more preferably from 2 to 30% by weight, and even more preferably from 3 to 20% by weight, of the polishing composition, from the viewpoint of increase in the polishing rate and smoothness of surface roughness. In addition, the silica particles having 4 or more projection portions are contained in a ratio of preferably 50% or more, more preferably 80% or more, and even more preferably 90% or more, of the total silica particles.

In addition, the polishing composition of the present invention has a pH of from 1 to 5, preferably from 1 to 3.5, and more preferably from 1 to 2.5, from the viewpoint of increase in the polishing rate and smoothness of surface roughness.

The pH of the polishing composition of the present invention can be adjusted, for example, depending on the content of an acid. The acid includes an inorganic acid and an organic acid. The inorganic acid includes hydrochloric acid, nitric acid, sulfuric acid, phosphoric acid, a polyphosphoric acid, amide sulfuric acid, and the like. In addition, the organic acid includes a carboxylic acid, an organic phosphoric acid, an amino acid, and the like. The carboxylic acid includes, for example, a monocarboxylic acid such as acetic acid, glycolic acid, and ascorbic acid; a dicarboxylic acid such as oxalic acid and tartaric acid; a tricarboxylic acid such as citric acid. The organic phosphoric acid includes 2-aminoethylphosphonic acid, 1-hydroxyethylidene-1,1-diphosphonic acid (HEDP), aminotri(methylenephosphonic acid), ethylenediaminetetra(methylenephosphonic acid), diethylenetriaminepenta(methylenephosphonic acid), and the like. In addition, the amino acid includes glycine, alanine, and the like. Among them, the inorganic acid, the carboxylic acid, and the organic phosphoric acid are preferable, from the viewpoint of increase in the polishing rate and smoothness of surface roughness. For example, hydrochloric acid, nitric acid, sulfuric acid, phosphoric acid, a polyphosphoric acid, glycolic acid, oxalic acid, citric acid, HEDP, aminotri(methylenephosphonic acid), ethylenediaminetetra(methylenephosphonic acid), or diethylenetriaminepenta(methylenephosphonic acid) is suitably used. These acids for adjusting pH may be used alone or in admixture of two or more kinds. The acid is contained in an amount of preferably from 0.1 to 10% by weight, more preferably from 0.1 to 7% by weight, and even more preferably from 0.1 to 5% by weight, of the polishing composition, from the viewpoint of increase in the polishing rate and smoothness of surface roughness.

It is preferable that the polishing composition of the present invention further contains a polymer having a sulfonic acid group as an aid, from the viewpoint of smoothness of surface roughness and increase in the polishing rate. The polymer having a sulfonic acid group, as used in the present invention, refers to a copolymer containing at least one or more monomers having a sulfonic acid group as a monomer component (hereinafter also referred to as "sulfonic acid"). In addition, the monomer having a sulfonic acid group includes, for example, isoprenesulfonic acid, (meth)acrylamide-2-methylpropanesulfonic acid, styrenesulfonic acid, methallylsulfonic acid, vinylsulfonic acid, allylsulfonic acid, isoamylenesulfonic acid, and the like. Isoprenesulfonic acid and (meth)acrylamide-2-methylpropanesulfonic acid are preferable. These monomers having a sulfonic acid group can be used alone or in admixture of two or more kinds.

The polymer having a sulfonic acid group of the present invention may be a homopolymer of a monomer component having a sulfonic acid group, or a copolymer further containing a monomer component of the other monomer. The monomer component of the other monomer is preferably a monomer having a carboxyl group. The monomer having a carboxyl group includes, for example, itaconic acid, (meth)acrylic acid, maleic acid, and the like. Among them, acrylic acid is preferable, i.e. an acrylic acid/sulfonic acid copolymer is preferable, from the viewpoint of the polishing rate and substrate stains.

The proportion of the sulfonic acid group-containing monomer in the monomers constituting the above-mentioned acrylic acid/sulfonic acid copolymer is preferably 3% by mol or more, and more preferably 5% by mol or more, from the viewpoint of maintaining the polishing rate and residual deposition of the copolymer itself on the substrate. Also, the proportion is preferably 90% by mol or less, and more preferably 80% by mol or less, from the viewpoint of economic advantages. In addition, the proportion is preferably from 3 to 90% by mol, and more preferably from 5 to 80% by mol.

The above-mentioned polymer having a sulfonic acid group is preferably water soluble, which may be, for example, in the form of a salt, in order to use the polymer as a constituent of the polishing composition.

The counterion for forming a salt is not particularly limited, and one or more members selected from alkali metal ions such as sodium ion and potassium ion, ammonium ion, alkylammonium ions and the like can be used.

The polymer having a sulfonic acid group usable in the present invention is obtained by, for example, sulfonating a base polymer containing a diene structure or an aromatic structure according to a known method, for example, a method described in "*Shin-Jikken Kagaku Koza* (*Lectures on New Experimental Chemistry*) 14 (*Yukikagobutsuno Goseito Hanno* (*Synthesis and Reaction of Organic Compounds*) III, p. 1773, 1978), Edited by Shadanhojin Nippon Kagakukai," or the like.

The polymer having a sulfonic acid group has a weight-average molecular weight of preferably from 1,000 to 5,000, more preferably from 1,000 to 4,500, and even more preferably from 1,000 to 4,000, from the viewpoint of giving an effect of dispersing silica and/or polishing debris, and polishing rate.

The weight-average molecular weight of the polymer is determined based on a calculation of the determination results by gel permeation chromatography (GPC) using a calibration curve drawn with sodium polystyrenesulfonate as a standard sample. The GPC conditions are as follows.

[GPC Conditions]
Column: G4000PWXL+G2500PWXL
Eluent: 0.2 M Phosphate buffer/acetonitrile=9/1 (volume ratio)
Flow rate: 1.0 mL/min
Temperature: 40° C.
Sample: concentration 5 mg/mL, amount of injection 100 µL The polymer having a sulfonic acid group is contained in an amount of preferably 0.001% by weight or more, and more preferably 0.01% by weight or more, of the polishing composition, from the viewpoint of reducing the substrate stains. In addition, the polymer is contained in an amount of preferably 10% by weight or less, more preferably 5% by weight or less, even more preferably 3% by weight or less, even more preferably 1% by weight or less, and even more preferably 0.5% by weight or less, of the polishing composition, from the viewpoint of the polishing rate. In other words, the polymer is contained in an amount of preferably from 0.001 to 10% by weight, more preferably from 0.01 to 5% by weight, even more preferably from 0.01 to 3% by weight, and even more preferably from 0.01 to 1% by weight, of the polishing composition, from the viewpoint of reducing the substrate stains and the polishing rate.

As the water usable in the present invention, ion-exchanged water, distilled water, ultrapure water or the like is preferably used. The water is contained in an amount of preferably from 50 to 99% by weight, more preferably from 50 to 98% by weight, and even more preferably from 50 to 97% by weight, of the polishing composition, from the viewpoint of increase in the polishing rate and smoothness of surface roughness.

In a standard polishing test of the present invention, a polishing composition for a glass substrate having surface roughness after polishing a substrate to be polished of 0.2 nm or less, and a polishing rate of a substrate to be polished of 0.08 μm/min or more is preferable. A standard polishing test refers to a test according to conditions described in Examples.

In the present invention, in a case where a substrate has been polished according to the standard polishing test, surface roughness after polishing a substrate to be polished is preferably 0.2 nm or less, more preferably 0.19 nm or less, even more preferably 0.18 nm or less, and even more preferably 0.17 nm or less, from the viewpoint of smoothness.

In a case where the polishing composition of the present invention has been used for the standard polishing test, the polishing rate of a substrate to be polished is preferably 0.08 μm/min or more, more preferably 0.09 μm/min or more, even more preferably 0.10 μm/min or more, and even more preferably 0.11 μm/min or more, from the viewpoint of productivity.

The polishing composition of the present invention can be prepared by mixing each of the components according to a known method. The polishing composition is usually manufactured as a concentrate and diluted upon use in many cases, from the viewpoint of economic advantages.

The materials of the object to be polished include, for example, quartz glass, soda-lime glass, aluminosilicate glass, borosilicate glass, aluminoborosilicate glass, non-alkaline glass, crystallized glass and the like. Among them, the aluminosilicate glass for a reinforced glass substrate or a glass ceramic substrate (crystallized glass substrate) is suitable for polishing.

A step of polishing a substrate and manufacturing of a substrate can be carried out by using the polishing composition of the present invention. For example, in a case where the substrate to be polished is a glass hard disk substrate, the substrate is generally manufactured through the steps of subjecting a glass substrate obtained by a die press of a molten glass, or a method of cutting out the substrate from a sheet glass to a rough grinding step, optionally a crystallizing step, a shaping step, a shoulder mirror-finishing step, a precision-grinding step, a polishing step, a cleaning step, optionally chemical reinforcement step, and a step of manufacturing a magnetic disk.

For example, in the rough grinding step, alumina abrasive grains of #400 or so are used; in the shaping step, a cylindrical grinding stone is used; in the shoulder mirror-finishing step, a brush is used; and in the precision-grinding step, alumina abrasive grains of #1000 or so are used.

The polishing step can be divided into a first polishing step and a second polishing step, and further a final (finish) polishing step may be carried out in many cases, for example, for the purpose of improving the surface quality.

Cerium oxide is preferably used in the first polishing step, and silica is preferably used in the final (finish) polishing step. It is preferable that the polishing composition of the present invention is used in the second polishing step or the final (finish) polishing step.

After the polishing step, in order to dissolve away the silica abrasive grains and polishing debris remaining on a glass substrate surface, the substrate is subjected to a strongly alkali ultrasonication cleaning with an aqueous NaOH or the like, and subsequently subjected to dip cleaning with ultrapure water, isopropanol or the like, and steam-drying with isopropanol or the like. Thereafter, a seed layer, an undercoat layer, an intermediate layer, a magnetic layer, a protective layer, and a lubricating layer are each formed into a film, to provide a magnetic disk.

In the course of the manufacturing steps, a crystallization step in which a crystal core is formed by a heat treatment to form a crystalline phase may be carried out in the case of a crystallized glass substrate, and a chemical reinforcement step in which a substrate is subjected to a dip treatment in a heated chemically reinforced salt such as potassium nitrate and sodium nitrate may be carried out to substitute the ions on the surface layer therewith in the case of a reinforced glass substrate.

As to the glass hard disk substrate, a smooth surface that does not generate any read-write errors in a magnetic head is required. In other words, the substrate surface is desired to be excellent in planarization (roughness, waviness and the like) and defects (projection portions such as abrasive grains, and dent portions such as scratches and pits). Among the steps for manufacturing a substrate, the polishing step plays a role for giving such excellent properties, and especially the second polishing step or the final (finish) polishing step is important.

Polishing Process

The polishing machine for a glass substrate using the polishing composition of the present invention is not particularly limited, and a polishing machine comprising a jig (carrier, made of aramide or the like) for holding an object to be polished and a polishing cloth (a polishing pad) can be used. Among them, a double-sided polishing machine that is usable in the polishing step is suitably used.

As to the polishing pad, a polishing pad made of an organic polymer-based foamed article, a non-foamed article, or a nonwoven fabric can be used. For example, a suede rigid pad made of urethane is suitably used in the first polishing step, and a suede soft pad made of urethane is suitably used in the second polishing step and the final polishing step.

Specific examples of the polishing process using the polishing machine include the steps of placing an object to be polished held with a carrier between polishing platens to which a polishing pad is attached, feeding the polishing composition of the present invention between the polishing pad and the object to be polished, and moving the polishing platens and/or the object to be polished, while applying a given pressure, thereby polishing the object to be polished while contacting with the polishing composition of the present invention.

The process for manufacturing a glass substrate of the present invention includes the step of polishing a substrate to be polished with a polishing load of from 3 to 12 kPa while allowing the above-mentioned polishing composition to be present between a polishing pad and the substrate to be polished.

The polishing load of the polishing step is 3 kPa or more, preferably 4 kPa or more, more preferably 5 kPa or more, and even more preferably 6 kPa or more, from the viewpoint of increasing the polishing rate, and obtaining smoothness of surface roughness. Also, the polishing load is 12 kPa or less, preferably 11 kPa or less, more preferably 10 kPa or less, and even more preferably 9 kPa or less, from the viewpoint of smoothing surface roughness. Therefore, the polishing load is from 3 to 12 kPa, preferably from 4 to 11 kPa, more preferably from 5 to 10 kPa, and even more preferably from 6 to 9 kPa, from the viewpoint of increase in the polishing rate and smoothness of surface roughness.

The above-mentioned polishing process is preferably employed in a second or subsequent polishing step, and more preferably in a final (finish) polishing step.

As the process for feeding a polishing composition, a process including the step of feeding a polishing composition, in the state that the constituents of the polishing composition are sufficiently mixed in advance, between a polishing pad and an object to be polished with a pump or the like; a process including the step of feeding a polishing composition prepared by mixing the constituents in the feed lines and the like immediately before polishing; a process including the step of separately feeding a silica slurry and an aqueous solution prepared by dissolving a polymer having a sulfonic acid group to a polishing machine; and the like can be used.

The substrate to be polished is polished by using the polishing composition of the present invention, or preparing a polishing composition by mixing each of the components so as to make up constituents for the polishing composition of the present invention. By polishing the substrate to be polished as mentioned above, a substrate having a high polishing rate and a low surface roughness of the substrate to be polished can be manufactured. Especially, the present invention is suitable for the manufacture of a glass hard disk substrate.

EXAMPLES

The following examples further describe and demonstrate embodiments of the present invention. The examples are given solely for the purposes of illustration and are not to be construed as limitations of the present invention.

For each of the silica particles used in polishing compositions of the following Examples 1 to 4 and Comparative Examples 1 to 7, (1) preparation of a silica particles image with TEM, (2) preparation of a black-and-white reverse image using the silica particles image by TEM, (3) preparation of an analysis image of a projected area of the silica particles (A1) using the black-and-white reverse image, (4) preparation of an analysis image of a maximum inscribed circle of the silica particles using the black-and-white reverse image and analysis of an area thereof (A), (5) calculation of an average area ratio R of the projected area of the silica particles (A1) to the maximum inscribed circle of the silica particles (A), i.e. (A1/A), and (6) preparation of an analysis image of the number of projection portions and analysis of an average number of projection portions using the silica particles image with TEM, were sequentially carried out.

(1) Preparation of Silica Particles Image with TEM

Silica particles were preliminarily observed with a transmission electron microscope (TEM) (JEM-2000FX, commercially available from JEOL LTD.) at an acceleration voltage of 80 kV and a magnification of 5,000 to 25,000 times, and an image further observed at a magnification of 100,000 times (FIG. 1 ($a$): a scale bar shows 20 nm) was obtained.

The image obtained in item (1) was analyzed in the image resolution of 0.22 nm/pixel for an image observed at a magnification of 100,000 times using an image analysis software (WinROOF, commercially available from MITANI CORPORATION).

(2) Preparation of Black-and-White Reverse Image Using Silica Particles Image by TEM First, a TEM silica particles image for any independent 20 particles was subjected to a hue adjustment/a black-and-white reverse, to prepare a black-and-white reverse image (FIG. 1 ($b$): a scale bar shows 20 nm).

Figure 2:
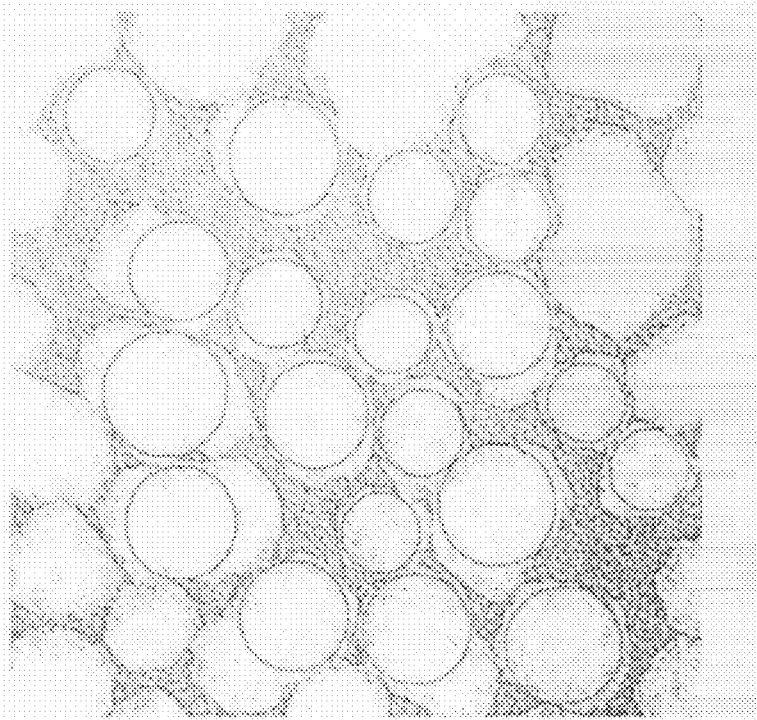
FIG. 2 (a) is an analysis image of a projected area of the silica particles using the black-and-white reverse image, and FIG. 2 (b) is an analysis image of a maximum inscribed circle of the silica particles using the black-and-white reverse image.
Figure 2:
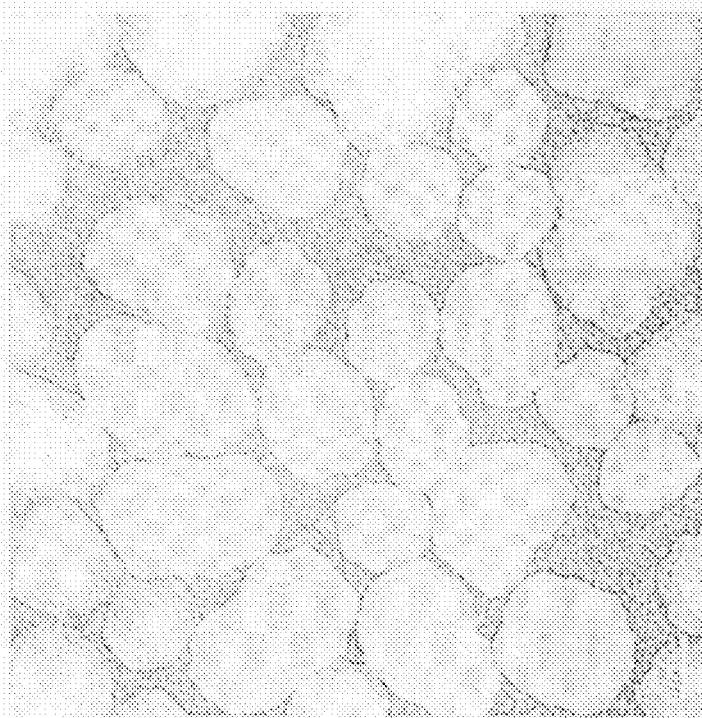

(3) Preparation of Analysis Image of Projected Area of Silica Particles (A1) Using Black-and-White Reverse Image After treatment to a black-and-white reverse image, a projected area analysis image (FIG. 2 ($a$): an area showing in each of the particles corresponds to a projected area, and a scale bar shows 20 nm) was prepared, so that the particles images are truly reproduced according to binarization, and manual operation as occasion demands, and a projected area (A1) for each of the particles obtained in item (2) is then obtained according to an automatic calculation.

(4) Preparation of Analysis Image of Maximum Inscribed Circle of Silica Particles Using Black-and-White Reverse Image and Analysis of Area Thereof (A)

A maximum inscribed circle was manually drawn for each of the particles obtained in item (2) to prepare an analysis image of the maximum inscribed circle (FIG. 2 ($b$): a circle in each of the particles is a maximum inscribed circle, and a scale bar shows 20 nm), and an area of the maximum inscribed circle (A) was further obtained.

(5) Calculation of Average Area Ratio R of Projected Area of Silica Particles (A1) to Maximum Inscribed Circle of Silica Particles (A), i.e. (A1/A)

An area ratio R of each of the particles was calculated from the projected area (A1) and an area of the maximum inscribed circle (A) corresponding to each of the particles of items (3) and (4), to obtain an average of the area ratio R.

Figure 3:
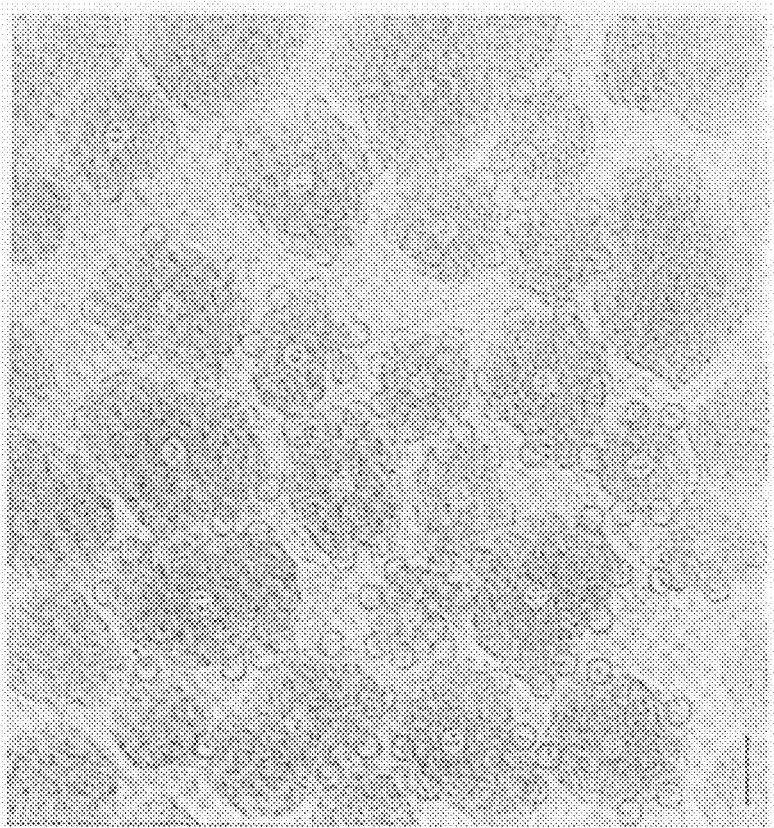
FIG. 3 is an analysis image of the number of projection portions of the silica particles using the silica particles image obtained by TEM.

(6) Preparation of Analysis Image of Number of Projection Portions and Analysis of Average Number of Projection Portions Using Silica Particles Image with TEM Further, the outlines of 20 silica particles in which the area ratio R was determined were carefully observed, and counted the number of the projection portions having a curvature radius of from ⅕ to ½ of a radius of the maximum inscribed circle of each of the particles (r) from the image observed at a magnification of 100,000 times (FIG. 1 ($a$)), to obtain an average number of the projection portions (FIG. 3: a numeral in each of the particles is a number randomly assigned, small circles in each of the particles are projection portions, and a scale bar shows 20 nm).

Table 1 shows an average area ratio R (A1/A), an average number of projection portions, and a ratio of the particles having 4 or more projection portions (%) in each of Examples and Comparative Examples.

Example 1

A polishing composition containing a colloidal silica a having a BET average particle size of 16 nm, an average area ratio R of 1.9, and an average number of projection portions of 4.9 as an abrasive, in an amount of 5% by weight based on net silica particles, HEDP (commercially available from Solutia Japan Limited, solid content: 60% by weight) in an amount of 0.13% by weight based on net HEDP, sulfuric acid (commercially available from Wako Pure Chemical Industries, Ltd., concentrated sulfuric acid, special grade reagent) in an amount of 0.40% by weight based on net sulfuric acid, and an acrylic acid/sulfonic acid copolymer (commercially available from TOAGOSEI CO., LTD., ARON A-6016A) in an amount of 0.08% by weight based on net copolymer, as acids, and the balance being ion-exchanged water was prepared. In addition, the order of mixing each component was such that a given amount of an aqueous solution of the above copolymer diluted five-folds with ion-exchanged water was added to an aqueous solution of HEDP and sulfuric acid while stirring and mixed, and finally the colloidal silica slurry was added thereto and mixed, to provide a polishing composition. The resulting polishing composition had a pH of 1.5.

Example 2

The same procedures as in Example 1 were carried out except that a colloidal silica b having a BET average particle size of 26 nm, an average area ratio R of 1.3, and an average number of projection portions of 5.4 was used as an abrasive, to provide a polishing composition. The resulting polishing composition had a pH of 1.5.

Example 3

The same procedures as in Example 1 were carried out except that a colloidal silica c having a BET average particle size of 23 nm, an average area ratio R of 1.6, and an average number of projection portions of 5.2 was used as an abrasive, to provide a polishing composition. The resulting polishing composition had a pH of 1.5.

Example 4

The same procedures as in Example 3 were carried out except that contents of HEDP, sulfuric acid, and an acrylic acid/sulfonic acid copolymer in a polishing composition were each reduced by 80%, to provide a polishing composition. The resulting polishing composition had a pH of 3.0.

Comparative Example 1

The same procedures as in Example 1 were carried out except that a colloidal silica e having a BET average particle size of 16 nm, an average area ratio R of 3.9, and an average number of projection portions of 1.4 was used as an abrasive, to provide a polishing composition. The resulting polishing composition had a pH of 1.5.

Comparative Example 2

The same procedures as in Example 1 were carried out except that a colloidal silica f having a BET average particle size of 28 nm, an average area ratio R of 3.4, and an average number of projection portions of 1.2 was used as an abrasive, to provide a polishing composition. The resulting polishing composition had a pH of 1.5.

Comparative Example 3

A polishing composition containing a colloidal silica b as an abrasive, in an amount of 10% by weight based on net silica particles, and the balance being ion-exchanged water was prepared. The resulting polishing composition had a pH of 10.2.

Comparative Example 4

The same procedures as in Comparative Example 3 were carried out except that a colloidal silica g having a BET average particle size of 80 nm, an average area ratio R of 1.1, and an average number of projection portions of 0.0 was used as an abrasive, to provide a polishing composition. The resulting polishing composition had a pH of 10.3.

Comparative Example 5

The same procedures as in Example 1 were carried out except that a colloidal silica g was used as an abrasive, to provide a polishing composition. The resulting polishing composition had a pH of 1.5.

Comparative Example 6

The same procedures as in Example 4 were carried out except that contents of HEDP, sulfuric acid, and an acrylic acid/sulfonic acid copolymer in a polishing composition were each reduced by 85%, to provide a polishing composition. The resulting polishing composition had a pH of 6.0.

Comparative Example 7

The same procedures as in Example 1 were carried out except that a colloidal silica d having a BET average particle size of 17 nm, an average area ratio R of 2.0, and an average number of projection portions of 1.3 was used as an abrasive, to provide a polishing composition. The resulting polishing composition had a pH of 1.5.

The substrate to be polished was polished under the following conditions with each of the polishing compositions obtained in Examples 1 to 4 and Comparative Examples 1 to 7, and the polishing rate and surface roughness were determined and evaluated according to the following methods.

<<Standard Polishing Test>>
Polishing testing machine: 9B-5P-IV type double-sided polishing machine, commercially available from Speedfam Co., Ltd.
Polishing pad: Finish polishing pad made of an urethane
Rotational speed of an upper platen: 10 r/min
Rotational speed of a lower platen: 30 r/min
Rotational speed of carrier: 10 r/min
Carrier: made of aramide, thickness of 0.45 mm
Feeding rate for polishing composition: 100 mL/min (about 0.3 mL/min/cm$^2$)
Polishing time period: 5 min
Polishing load: 5.9 kPa
Substrate to be polished: a glass substrate made of aluminosilicate for hard disks, having a thickness of 0.635 mm, an outer diameter of 65 mm and an inner diameter of 20 mm, previously adjusted to AFM-Ra (surface roughness) of 0.3 nm
Number of substrates introduced: 10
Rinsing conditions: load: 2.0 kPa, time: 5 min feeding rate for ion-exchanged water: about 2 L/min
Dressing conditions: A brush dressing was carried out for 2 minutes in every cycle of polishing, while feeding ion-exchanged water.

<<Method of Calculating Polishing Rate>>
A weight difference in a substrate before and after polishing (g) was divided by the density of the substrate (2.46 g/cm$^3$), the surface area of the substrate (30.04 cm$^2$) and the polishing time (minute), to provide a polished amount per unit time, and the polishing rate (μm/minute) was calculated. The results are shown in Table 1.

<<Cleaning Process of Substrate>>
The substrate to be polished was taken out after the termination of polishing and rinsing, and cleaned under running water of ion-exchanged water. Next, the substrate was subjected to ultrasonic cleaning (100 kHz, 3 min), while being immersed in ion-exchanged water. The substrate was further cleaned under running water of ion-exchanged water, and dried by a spin-dry method. As surface roughness, AFM-Ra (surface roughness) was determined for the cleaned substrate with an atomic force microscope (AFM) as follows. The results are shown in Table 1.

<<Evaluation Method of Surface Roughness of Substrate>>

Determination Apparatus: TM-M5E, commercially available from Veeco
Mode: non-contact
Scan rate: 1.0 Hz
Scan area: 10 μm×10 μm
Evaluation method: Surface roughness was obtained by taking determinations at two scanning points near the midpoints of the inner circumference and the outer circumference on any center lines of a substrate, and obtaining an average thereof, which was used as AFM-Ra (surface roughness).

TABLE 1

| | | Silica | | | Polishing Composition | | | |
|---|---|---|---|---|---|---|---|---|
| | Type | Average Particle Size* (nm) | Average Area Ratio R (A1/A) | Average Number of Projection Portions (number) | Ratio of Particles Having 4 or More Projection Portions (%) | Content of Silica (% by wt.) | pH | Polishing Rate (um/min) | Surface Roughness (nm) |
| Ex. 1 | a | 16 | 1.9 | 4.9 | 90 | 5 | 1.5 | 0.110 | 0.14 |
| Ex. 2 | b | 26 | 1.3 | 5.4 | 100 | 5 | 1.5 | 0.138 | 0.14 |
| Ex. 3 | c | 23 | 1.6 | 5.2 | 90 | 5 | 1.5 | 0.128 | 0.15 |
| Ex. 4 | c | 23 | 1.6 | 5.2 | 90 | 5 | 3.0 | 0.090 | 0.16 |
| Comp. Ex. 1 | e | 16 | 3.9 | 1.4 | 0 | 5 | 1.5 | 0.066 | 0.15 |
| Comp. Ex. 2 | f | 28 | 3.4 | 1.2 | 5 | 5 | 1.5 | 0.026 | 0.22 |
| Comp. Ex. 3 | b | 26 | 1.3 | 5.4 | 100 | 10 | 10.2 | 0.022 | 0.21 |
| Comp. Ex. 4 | g | 80 | 1.1 | 0.0 | 0 | 10 | 10.3 | 0.028 | 0.22 |
| Comp. Ex. 5 | g | 80 | 1.1 | 0.0 | 0 | 5 | 1.5 | 0.078 | 0.28 |
| Comp. Ex. 6 | c | 23 | 1.6 | 5.2 | 90 | 5 | 6.0 | 0.051 | 0.18 |
| Comp. Ex. 7 | d | 17 | 2.0 | 1.3 | 5 | 5 | 1.5 | 0.086 | 0.16 |

*Average particle size according to a nitrogen absorption method (BET)

The results in Table 1 showed that the polishing compositions obtained in Examples 1 to 4 have high polishing rates and low surface roughness, as compared to those of Comparative Examples 1 to 7.

The polishing composition for a glass substrate of the present invention can be suitably used, for example, in the manufacture of glass hard disks, aluminosilicate glass for reinforced glass substrates, glass ceramic substrates (crystallized glass substrates), and the like.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition for a glass substrate having a pH of from 1 to 5 and comprising silica particles having an average particle size of from 5 to 100 nm, wherein, in a projected image of the silica particles obtainable by an image analysis of electron photomicrographs, an average of an area ratio R of a projected area of the silica particles (A1) to an area of a maximum inscribed circle of the silica particles (A), i.e. (A1/A), is in the range of from 1.2 to 3.0, and the silica particles have an average of 2.0 to 10 projection portions extending from the surface of the projected image, having a curvature radius of from ⅕ to ½ of a radius of the maximum inscribed circle of the silica particles (r) on the outline of the silica particles in the projected image.

2. The polishing composition according to claim 1, wherein the silica particles are colloidal silica particles.

3. The polishing composition according to claim 2, further comprising a polymer having a sulfonic acid group.

4. The polishing composition according to claim 1, further comprising a polymer having a sulfonic acid group.

5. A method for manufacturing a glass substrate, comprising the step of polishing a substrate to be polished with a polishing load of from 3 to 12 kPa and at a pH of from 1 to 3.5 while allowing a polishing composition comprising silica particles having an average particle size of from 5 to 100 nm to be present between a polishing pad and the substrate to be polished, wherein, in a projected image of the silica particles obtainable by an image analysis of electron photomicrographs, an average of an area ratio R of a projected area of the silica particles (A1) to an area of a maximum inscribed circle of the silica particles (A), i.e. (A1/A), is in the range of from 1.2 to 3.0, and the silica particles have an average of 2.0 to 10 projection portions extending from the surface of the projected image, having a curvature radius of from ⅕ to ½ of a radius of the maximum inscribed circle of the silica particles (r) on the outline of the silica particles in the projected image, wherein the glass substrate is a glass hard disk substrate.

6. The method for manufacturing a glass substrate according to claim 5, wherein the silica particles are colloidal silica particles.

7. The method for manufacturing a glass substrate according to claim 5, wherein the polishing composition further comprises a polymer having a sulfonic acid group, and wherein the polymer having a sulfonic acid group is water soluble.

* * * * *